No. 888,640. PATENTED MAY 26, 1908.
J. MURPHY.
CAR TRUCK.
APPLICATION FILED AUG. 9, 1907.
2 SHEETS—SHEET 1.
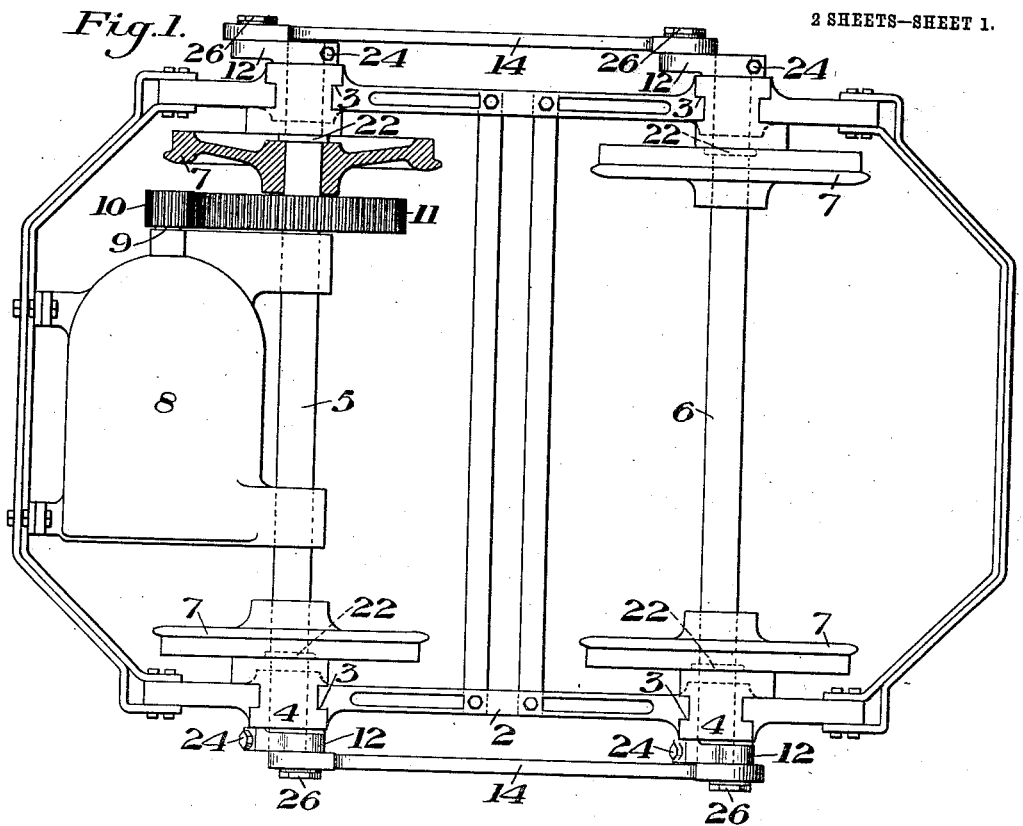
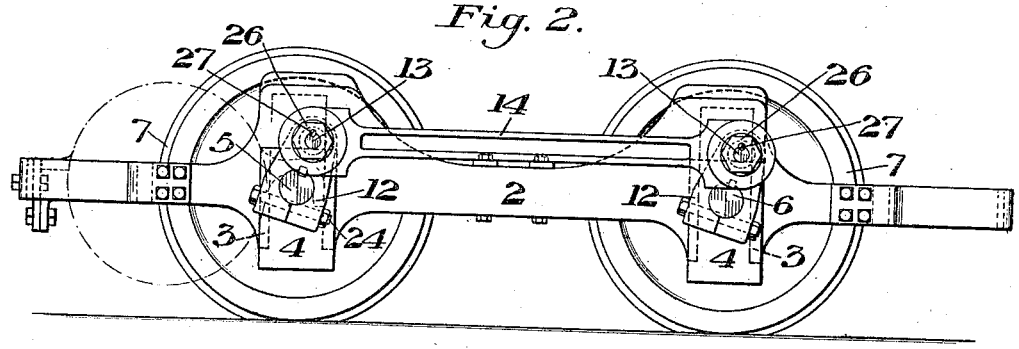

No. 888,640. PATENTED MAY 26, 1908.
J. MURPHY.
CAR TRUCK.
APPLICATION FILED AUG. 9, 1907.
2 SHEETS—SHEET 2.
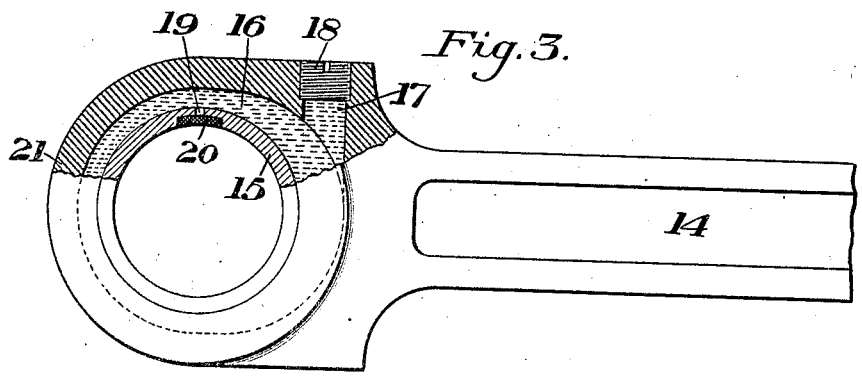
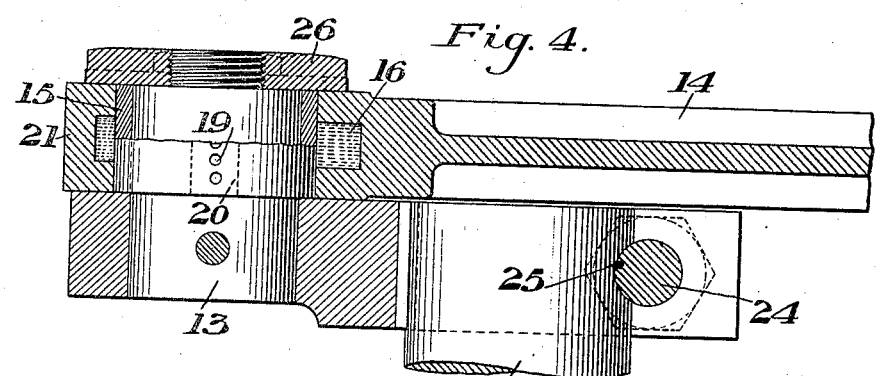
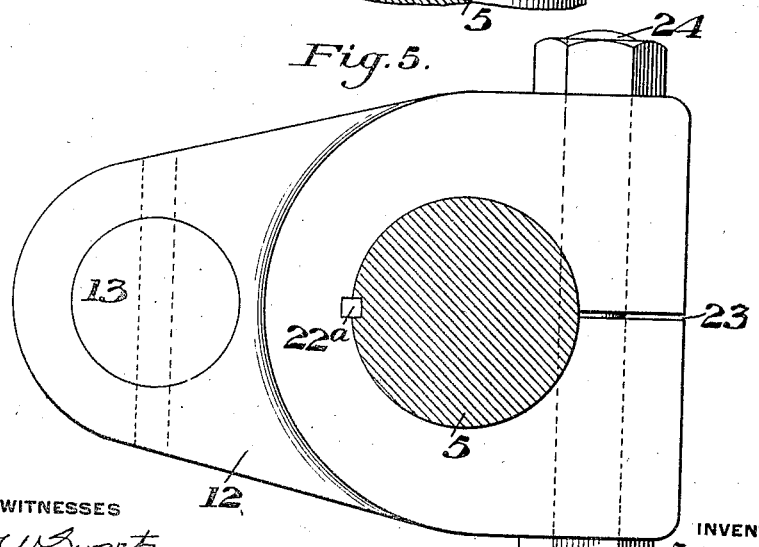
WITNESSES
INVENTOR

UNITED STATES PATENT OFFICE.

JOHN MURPHY, OF PITTSBURG, PENNSYLVANIA.

CAR-TRUCK.

No. 888,640.  Specification of Letters Patent.  Patented May 26, 1908.

Application filed August 9, 1907. Serial No. 387,857.

*To all whom it may concern:*

Be it known that I, JOHN MURPHY, of Pittsburg, Allegheny county, Pennsylvania, have invented a new and useful Improvement in Car-Trucks, of which the following is a full, clear, and exact description, reference being had to the accompanying drawings, forming part of this specification, in which—

Figure 1 is a bottom plan view of a car truck embodying my invention, one of the wheels being shown in section; Fig. 2 is a side view of the same with the motor indicated in dotted lines; Figs. 3 and 4 are detail sectional views showing the manner of attaching and lubricating the connection rods or bars; and Fig. 5 is a detail view showing one manner of attaching the cranks to the car axles.

My invention has relation to motive driven car trucks, and is designed to provide means for increasing the traction of the car wheels. In accordance with my invention, one of the axles of each truck is driven by direct gearing connection with a motor, and both axles are extended through the journal boxes beyond the side bars of the truck, and are provided with cranks which are united at each side by a connecting rod or bar whereby both axles are positively driven.

Referring to the accompanying drawings, in which I have shown one form of my invention, the numeral 2 designates the truck frame which may be of any suitable construction, and whose side bars are provided with guides 3 for the journal boxes 4.

5 and 6 designate the axles of the truck, and 7 the car wheels.

8 is an electric motor which is sleeved upon the axle 5 at one side and supported from the end bar of the truck frame in any suitable or usual manner at its opposite side, its armature shaft 9 having a pinion 10 whose teeth engage the teeth of a spur wheel 11 rigidly secured to the axle 5. The journal boxes 4 are open at both ends, and the axles 5 and 6 are extended entirely through the same beyond the side bars. To the projecting ends of each axle are secured cranks 12 having pins 13. The two cranks at each side are connected by the connecting bars or rods 14 whose end portions are provided with bearings 15 which fit the pins 13. The end portions of the connecting rods are formed with the lubricant chambers 16 which surround the bearing sleeves 15. These chambers are filled through the openings 17, which may be normally closed by the screw plugs 18. The sleeves 15 are each formed with one or more slots or openings 19 extending therethrough and communicating at their inner ends with pieces 20 of felt or other lubricant conducting material, which are seated in the inner faces of the sleeves across the said openings in contact with the pins 13. The lubricant chambers 16 are preferably of eccentric form, as shown in Fig. 3, in order to provide increased capacity without necessitating the thickening of the end walls 21. This form of the lubricant chambers is also advantageous, for the reason that the body of lubricant being eccentrically disposed with reference to the axis of the pin 13, the movement of the connecting bars or rods causes a greater agitation of the lubricant.

In order to relieve the connecting bars or rods from end thrusts of the axles, the latter are provided between each wheel and the adjacent journal box with a thrust collar 22.

The cranks 12 are preferably removably secured to the axles by keys $22^a$ which can be removed to permit the cranks to be taken off when it is desired to remove and replace the wheels. To this end the cranks are split, as shown at 23, in Fig. 5 and are slipped onto the ends of the axles and secured by a bolt 24 which also fits a recess 25 in the axles as shown in Fig. 4. This enables a tight fit of the cranks on the axles, and also permits endwise movement of the cranks on the axles.

The connecting rods are secured on the crank pins 13 by the nuts 26 which are locked by the set-screws 27.

Actual tests of a car truck embodying my invention have shown that the attractive force is increased approximately twenty-five percent. without increasing the power of the motor, this being due to the fact that both axles are positively driven.

My invention is applicable to both single and double trucks, and may be applied to any ordinary form of truck by substituting journal boxes which will permit the axles to be extended beyond the side frames in the manner described, so that the connecting rods can be attached to the cranks on the end of the axles outside of the side frames.

Various changes may be made in the details of construction and arrangement by those skilled in the art without departing from the spirit and scope of my invention.

What I claim is:—

1. In an electric car truck, a truck frame having a pair of axles journaled therein, said axles being extended through their journal boxes and beyond the side frames of the truck, and carrying wheels at the inside of the side frames, cranks secured on the extended ends of the axles, bars connecting the cranks, and an electric motor geared to one of said axles between the side frames, substantially as described.

2. In an electric car truck, a truck frame having a pair of axles journaled therein, said axles being extended through their journal boxes and beyond the side frames of the truck, and carrying wheels at the inside of the side frames, cranks secured on the extended ends of the axles, bars connecting the cranks, and an electric motor geared to one of said axles between the side frames, together with thrust bearings on the axles between the wheels and side frames for relieving the connecting bars from side-thrusts, substantially as described.

3. In an electric car truck, a truck frame having a pair of axles journaled therein, said axles being extended through their journal boxes and beyond the side frames of the truck, and carrying wheels at the inside of the side frames, cranks secured on the extended ends of the axles, bars connecting the cranks, and an electric motor geared to one of said axles between the side frames, together with means for lubricating the crank-pins, substantially as described.

4. In an electric car truck, having two axles, a driving motor arranged to exert a rotary torque upon one of said axles between the side frames of the truck, said axles having their wheels inside of said side frames and their ends extended through said frames and provided with cranks, and connecting rods or bars connecting the axle cranks at each side of the truck, substantially as described.

5. In an electric car truck, a pair of axles having wheels inside the truck frame and cranks outside the truck frame, a rod or bar connecting said cranks, and a motor connected to one axle between the side frames, substantially as described.

6. In a car truck, axles extended at their ends beyond the side-frames of the truck, and having cranks at their extended ends, connecting rods attached to the said crank, said rods having lubricant chambers therein surrounding the crank pins and communicating therewith, and means for driving one of the axles; substantially as described.

In testimony whereof, I have hereunto set my hand.

JOHN MURPHY.

Witnesses:
 GEO. H. PARMELEE,
 H. M. CORWIN.